U.S. Patent Office 3,810,862
Patented May 14, 1974

3,810,862
CHAR-FORMING, FLAME RETARDANT
POLYOLEFIN COMPOSITION
Ronald D. Mathis, Taylors, and James S. Dix, Greenville, S.C., assignors to Phillips Petroleum Company
No Drawing. Filed Feb. 14, 1972, Ser. No. 226,277
Int. Cl. C09k 3/28
U.S. Cl. 260—42.45                    5 Claims

ABSTRACT OF THE DISCLOSURE

Normally solid propylene homopolymer or a propylene copolymer with a minor amount of another 1-olefin containing two to eight carbon atoms per molecule and mixtures thereof are formed into a char-forming, flame retardant composition by incorporating ammonium polyphosphate, dipentaerythritol, melamine, and for best results an inorganic filler. Included among fillers are titanium dioxide and kaolin.

---

This invention relates to char-forming, flame retardant additive composition. It also relates to a char-forming, flame retarded polyolefin composition.

In one of its concepts, the invention provides a char-forming, flame retardant additive system for a polyolefin containing composition, the additive comprising ammonium polyphosphate, dipentaerythritol, and melamine. In another concept, the invention provides such a composition also containing an inorganic filler. In a further concept of the invention, it provides a char-forming, flame retarded polyolefin composition comprising a normally solid propylene homopolymer or a propylene copolymer prepared employing a minor amount of another 1-olefin containing 2–8 carbon atoms per molecule and mixtures thereof and composited with the polyolefin ammonium polyphosphate, dipentaerythritol, melamine, and in the now preferred embodiment, an inorganic filler.

We have now discovered that an effective flame retardant, char-forming additive system for polypropylene comprises ammonium polyphosphate, dipentaerythritol, and melamine. We have also discovered that the addition of an inorganic filler yields improved results.

It is an object of this invention to provide a char-forming, flame retardant system for a polyolefin. Another object of the invention is to provide a char-forming, flame retarded polyolefin composition. A further object of the invention is to provide an improved polyolefin composition. A still further object of the invention is to provide a char-forming, flame retarded composition comprising at least one of a normally solid propylene homopolymer, a propylene copolymer with a minor amount of another 1-olefin containing 2–8 carbon atoms per molecule, and mixtures thereof.

Other aspects, concepts, objects, and the several advantages of the invention are apparent from a study of this disclosure and the appended claims.

According to the invention, there is provided a char-forming, flame retardant composition or additive comprising ammonium polyphosphate, dipentaerythritol, and melamine. Also according to the invention and in the now preferred embodiment thereof, the additive system also comprises an inorganic filler.

Also according to the invention, there is provided a char-forming, flame retarded polyolefin composition which comprises at least one of a normally solid propylene homopolymer, a propylene copolymer with a minor amount of another 1-olefin containing 2–8 carbon atoms per molecule and mixtures thereof, and ammonium polyphosphate, dipentaerythritol, and melamine. Still further according to the invention, the now preferred polyolefin containing composition will also contain an inorganic filler.

The normally solid propylene polymers and copolymers or mixtures thereof to which the invention is particularly applicable can have any melt flow as determined by test procedure ASTM D 1238–62T Condition L that are shapable by conventional plastics fabrication techniques such as extrusion, injection molding, blow molding, and the like. However, it is now preferred that a polymer with melt flow ranging from about 0.1 to 20 be used to produce the polyolefin composition according to the invention. Thus, polypropylene with a melt flow in the range indicated is quite suitable.

As fillers there can be used preferably finely divided inorganic fillers which are inert in the formulations and which include talc, zinc oxide, calcium carbonate, titanium dioxide, and kaolin. Of the recited fillers, titanium dioxide and kaolin are now preferred.

It appears that the fillers act as nucleating agents for ready production of the char when the compositions are exposed to high temperatures such as to flames or to hot air. Accordingly, the fillers employed are inert except as they will act as nucleating agents for the ready production of the char.

Although the amounts or proportions of the various ingredients which are suitable can be determined by mere routine tests, the following are now preferred.

The weight ratio of the additives ammonium polyphosphate/dipentaerythritol/melamine can be 0.4–5.3/1.0/0.1–2.0 with a ratio of about 0.75–2.3/1.0/0.3–1.2 presently preferred. Usually, about 10 to about 20 parts by weight (php.) of the additive system per 100 parts by weight of the polyolefin are used to obtain the desired results. A more preferred range is about 12 to 18 php.

The inorganic fillers, depending upon the choice and compounding factors such as state of subdivision and efficiency of mixing, etc., will be present in an amount of from about 0.2 to about 5.0 php. Presently from about 1 to about 3 php., more preferably of the order of about 1 php. of inorganic filler are used.

The compositions of the invention can contain additives including thermal stabilizers, UV stabilizers, pigments, antistatic agents, etc. In selecting such additives, one skilled in the art will understand that they should not have a negative effect with respect to char formation and with respect to flame retardancy.

Included among suitable thermal stabilizers are the following: conventional types such as 2,6-di-t-butyl-4-methylphenol (BHT), octadecyl[3-(3,5-di-t-butyl-4-hydroxyphenyl)]propionate, tetrakis[methylene(3,5 - di - t-butyl-4 - hydroxyhydrocinnamate)]methane, di-n-octadecyl(3,5-di-t-butyl - 4 - hydroxybenzyl)phosphonate, 1,3,5-trimethyl-2,4,6 - tris(3,5 - di - t - butyl-4-hydroxybenzyl)benzene, and the like. BHT is the now preferred stabilizer which is used.

Polymers containing the additive system are suitable for conversion into a host of articles by employing such fabrication techniques as extrusion, injection molding, blow molding, thermoforming, and the like. Examples of such articles include wastepaper baskets, seats, small boat hulls, containers, dune buggy bodies, and the like.

The preparation of a char-forming composition having a relatively high Limiting Oxygen Index (LOI) is difficult in that it is not possible to reason from compounds proven acceptable to other compounds.

The LOI is determined according to method known in the art. An LOI of 0.21 but preferably higher, say, 0.22, is ordinarily the minimum acceptable value for compositions according to the invention.

Thus, within the ratios given herein and considering the data, it appears now that when about three or so php. of melamine is used the weight ratio of ammonium polyphosphate to the dipentaerythritol should be maintained between about 0.5 to 1 to about 5 to 1, the php. sum of those components equaling about 10.

Further, when about five php. of ammonium polyphosphate and about five php. of dipentaerythritol are used, the weight ratio of melamine to dipentaerythritol preferably should be maintained between about 0.2 to 1 to about 1.7 to 1.

Still further, the minimum total level of ammonium polyphosphate, dipentaerythritol and melamine should be at least about 10 php. and when a filler is also used, which is now preferred, the total amount of the additive system should be at least about 11 php. An upper limit of about 20 php. is now preferred for economical reasons and to prevent undue loss of physical properties of the polymer.

SPECIFIC EXAMPLE

In the tabulation below the runs or tests were made with Phos-Chek P/30 (a trademark), a commercially available ammonium polyphosphate suitable as a fire retardant additive.

mation over a wide range of ratios. However, the LOI's are essentially the same as for polypropylene containing no flame retardant additives. Addition of melamine causes a marked increase in the LOI, the maximum LOI occurring with a Phos-Chek/DPE weight ratio of 1.0–1.5/1.0. A proper weight ratio of melamine to the other additives is also important for obtaining a maximum LOI as shown by samples 7, 11, 12, 13, and 14. This ratio was found to be 0.37–1.0/1.0 melamine/DPE. The importance of $TiO_2$ or kaolin (or other nucleating agent) is shown by the lowering of the LOI when either is omitted (compare sample 17 with samples 12 and 18). $TiO_2$ is somewhat superior to kaolin in this application.

The LOI was found to bear a nearly linear relationship to the total additive concentration.

Reasonable variation and modification are possible within the scope of the foregoing disclosure and the appended claims to the invention the essence of which is that char-forming, flame retarded polyolefin compositions, as set forth and described herein, have been made possible by adding thereto ammonium polyphosphate, dipentaerythritol, and melamine and, preferably, also a filler, also as described, and that although the optimum ratios and

TABLE I

| Sample [a] number | Phos-Chek, php. | DPE, php. | Melamine, php. | $TiO_2$, php. | Kaolin, php. | Phos-Chek/DPE/melamine Molar ratio | Phos-Chek/DPE/melamine Weight ratio | LOI [b] |
|---|---|---|---|---|---|---|---|---|
| 1 | 5.0 | 5.0 | | 1.0 | | 2.6/1/0 | 1/1/0 | 0.19 |
| 2 | 7.0 | 3.0 | | 1.0 | | 6.2/1/0 | 2.3/1/0 | 0.19 |
| 3 | 8.5 | 1.5 | | 1.0 | | 14.6/1/0 | 5.3/1/0 | 0.19 |
| 4 | 3.0 | 7.0 | | 1.0 | | 1.1/1/0 | 0.4/1/0 | 0.18 |
| 5 | 3.0 | 7.0 | 3.0 | 1.0 | | 1.1/1/0.9 | 0.4/1/0.4 | 0.21 |
| 6 | 4.3 | 5.7 | 3.0 | 1.0 | | 1.8/1/1 | 0.75/1/0.5 | 0.25 |
| 7 | 5.0 | 5.0 | 3.0 | 1.0 | | 2.6/1/1.2 | 1/1/0.6 | 0.26 |
| 8 | 6.0 | 4.0 | 3.0 | 1.0 | | 3.9/1/1.5 | 1.5/1/0.75 | 0.26 |
| 9 | 7.0 | 3.0 | 3.0 | 1.0 | | 6.2/1/2 | 2.3/1/1 | 0.24 |
| 10 | 8.5 | 1.5 | 3.0 | 1.0 | | 14.6/1/4 | 5.3/1/2 | 0.22 |
| 11 | 5.0 | 5.0 | 1.5 | 1.0 | | 2.6/1/0.6 | 1/1/0.3 | 0.25 |
| 12 | 5.0 | 5.0 | 4.5 | 1.0 | | 2.6/1/1.8 | 1/1/0.9 | 0.26 |
| 13 | 5.0 | 5.0 | 6.0 | 1.0 | | 2.6/1/2.4 | 1/1/1.2 | 0.25 |
| 14 | 5.0 | 5.0 | 10.0 | 1.0 | | 2.6/1/4 | 1/1/2 | 0.20 |
| 15 | 4.0 | 4.0 | 3.6 | 1.0 | | 2.6/1/1.6 | 1/1/0.9 | 0.23 |
| 16 | 3.0 | 3.0 | 2.7 | 1.0 | | 2.6/1/1.8 | 1/1/0.9 | 0.21 |
| 17 | 5.0 | 5.0 | 4.5 | | | 2.6/1/1.8 | 1/1/0.9 | 0.24 |
| 18 | 5.0 | 5.0 | 4.5 | | 1.0 | 2.6/1/1.8 | 1/1/0.9 | 0.25 |

[a] All in 3MF polypropylene. All also contain 0.5 php. BHT.
[b] All systems charred.

NOTE.—MF is melt flow.

From the foregoing disclosure and the data, it can be seen that we have found that such combinations as have been made of ammonium polyphosphate, dipentaerythritol and melamine function to provide char formation in polypropylene. More importantly, we have found that within a well defined range of relative molar ratios of these additives and, particularly, with the addition of a filler such as titanium dioxide or kaolin clay, the LOI of polypropylene can be dramatically increased to giving a high degree of flame retardancy.

The various formulations which were tested were mixed by tumbling the additives and the polypropylene (3MF) for 30 minutes, and then further mixed by masticating in a Brabender Plastigraph at 230° C. for 5 minutes under a nitrogen atmosphere. Bars measuring 1/8″ thick, 1/2″ wide and 5″ long were compression molded and used for evaluation of char formation and LOI.

Data in Table I (samples 1 through 4) show that combinations of ammonium polyphosphate (sold by Monsanto under the trade name Phos-Chek P/30) and dipentaerythritol (DPE) in the presence of $TiO_2$ cause char for-amounts are determinable in the light of the foregoing disclosure the ones given now are preferred.

We claim:

1. A char-forming, flame retarded polyolefin-containing composition comprising incorporated together in admixture a polyolefin and a minor proportion up to about 20 parts per 100 parts of the polyolefin of a system, suitable for imparting such properties to said polyolefin, which comprises essentially ammonium polyphosphate, dipentaerythritol, and melamine and wherein the weight ratios, respectively, of the ingredients of said system are about 0.4–5.3/1.0/0.1–2.

2. A char-forming, flame retarded polyolefin-containing composition according to claim 1 in which the polyolefin is at least one of a normally solid propylene homopolymer, a propylene copolymer with a minor amount of another 1-olefin containing 2–8 carbon atoms per molecule and mixtures thereof.

3. A composition according to claim 1 wherein there is included an inert filler which acts as a nucleating agent.

4. A composition according to claim 3 wherein the filler is selected from titanium dioxide, kaolin, talc, zinc oxide, calcium carbonate.

5. A composition according to claim 4 wherein the total parts by weight of the additive system used with 100 parts by weight of polymer are in the approximate range of from about 10 to about 20 parts.

References Cited

UNITED STATES PATENTS

| | | | |
|---|---|---|---|
| 3,037,951 | 6/1962 | Basto et al. | 260—22 |
| 3,397,035 | 8/1968 | Shen et al. | 23—106 |
| 3,562,197 | 2/1971 | Sears et al. | 260—28.5 |
| 3,639,304 | 2/1972 | Raley, Jr. | 260—2.5 |
| 3,649,591 | 3/1972 | Murray et al. | 260—41 |
| 3,654,190 | 4/1972 | Levine | 260—2.5 |
| 3,663,502 | 5/1972 | Murray et al. | 260—41 |
| 3,666,712 | 5/1972 | Weil | 260—45.7 |
| 3,666,715 | 5/1972 | Kutner | 260—45.8 |
| 3,591,507 | 7/1971 | Drake et al. | 252—8.1 |

DONALD E. CZAJA, Primary Examiner

R. A. WHITE, Assistant Examiner

U.S. Cl. X.R.

260—897 A, 45.8 N, 45.9 R, 45.95 S